(12) United States Patent
Schwartz (10) Patent No.: US 6,816,109 B1
(45) Date of Patent: Nov. 9, 2004

(54) METHOD FOR AUTOMATIC ASSOCIATION OF MOVING TARGET INDICATIONS FROM ENTITIES TRAVELING ALONG KNOWN ROUTE

(75) Inventor: Steven A. Schwartz, Melbourne Beach, FL (US)

(73) Assignee: Northrop Grumman Corporation, Los Angeles, CA (US)

( * ) Notice: Subject to any disclaimer, the term of this patent is extended or adjusted under 35 U.S.C. 154(b) by 7 days.

(21) Appl. No.: 10/633,825

(22) Filed: Aug. 4, 2003

(51) Int. Cl.[7] .......................... G01S 13/52; G01S 13/00
(52) U.S. Cl. ...................... 342/160; 342/89; 342/90; 342/159; 342/175; 342/195; 382/276; 382/281
(58) Field of Search ................. 342/73–82, 89–105, 342/118, 128–147, 149–164, 175, 192–196; 382/276, 281

(56) References Cited

U.S. PATENT DOCUMENTS

| | | |
|---|---|---|
| 1,400,803 A | 12/1921 | Conlan, Jr. |
| 2,700,140 A | 1/1955 | Phillips |
| 3,612,949 A | 10/1971 | Becraft et al. |
| 3,631,489 A * | 12/1971 | Cooper .................. 342/161 |
| 3,633,212 A | 1/1972 | Cooper |
| 3,709,608 A | 1/1973 | Degan et al. |
| 3,742,500 A * | 6/1973 | Freedman .............. 342/102 |
| 3,765,017 A * | 10/1973 | Dentino .................. 342/162 |
| 4,168,123 A | 9/1979 | Price |
| 4,210,912 A * | 7/1980 | Naidich et al. ......... 342/149 |
| 4,217,583 A | 8/1980 | Hiller et al. |
| 4,649,274 A | 3/1987 | Hartmann |
| 4,768,034 A | 8/1988 | Preikschat et al. |
| 4,885,590 A * | 12/1989 | Hasan .................... 342/196 |
| 5,005,973 A | 4/1991 | Mimmack et al. |
| 5,045,860 A | 9/1991 | Hodson |
| 5,066,956 A | 11/1991 | Martin |
| 5,425,136 A | 6/1995 | Lo et al. |
| 5,430,810 A | 7/1995 | Saeki |

(List continued on next page.)

OTHER PUBLICATIONS

Ulf Grenander Representations of Knowledge in Complex Systems, Royal Statistical Society, pp. 549–601 (1994).

Steven A. Schwartz (Abstract)Bayesian Estimation of Protein Conformation in a Pattern–Theoretic . . . , p. 1 (Dec. 1995).

Philip D. Stroud and Ray C. Gordon Automated Military Unit Identification . . . , SPIE vol. 3069, p. 375–385, Los Alamos, NM(no date).

Harry L. Van Trees Detection Estimation and Modulation Theory, Massachusetts Institute of Technology, p. 58 (no date).

Ulf Grenander The 1985 Rietz Lecture, Brown University, p. 1–30 (1985).

*Primary Examiner*—Bernarr Earl Gregory
(74) *Attorney, Agent, or Firm*—Stetina Brunda Garred & Brucker (57) ABSTRACT

A method for automatic association of moving target indications from at least one entity traveling along a route. A moving target indicator radar is used to detect a plurality of moving target indication data. The moving target indication data proximate to the identified route is selected and presented in a distance-time graph, such that each selected moving target indication data has a unique distance along route and a unique observation-time value. The selected moving target indication data are then transformed from the distance-time coordinate to a slope-intercept coordinate, such that co-linear moving target indication data in the distance-time coordinate are transformed into a plurality of points superposed together with nearly identical slope values and nearly identical distance intercept value. The superposed points are mapped back to the distance-time coordinate, and the moving target indication data corresponding to the superposed points are thus associated. The method can be generalized to finding convoys.

25 Claims, 4 Drawing Sheets

U.S. PATENT DOCUMENTS

| | | |
|---|---|---|
| 5,497,705 A | 3/1996 | Bredy et al. |
| 5,594,450 A | 1/1997 | Schober |
| 5,600,893 A | 2/1997 | Phillips |
| 5,629,989 A | 5/1997 | Osada |
| 5,638,465 A | 6/1997 | Sano et al. |
| 5,818,383 A | 10/1998 | Stockburger et al. |
| 5,825,915 A | 10/1998 | Michimoto et al. |
| 5,909,189 A | 6/1999 | Blackman et al. |
| 5,936,723 A | 8/1999 | Schmidt et al. |
| 5,953,452 A | 9/1999 | Boone et al. |
| 5,959,574 A | 9/1999 | Poore, Jr. |
| 6,067,041 A | 5/2000 | Kaiser et al. |
| 6,081,222 A | 6/2000 | Henkel et al. |
| 6,260,759 B1 | 7/2001 | Nguyen et al. |
| 6,531,965 B1 | 3/2003 | Kaiser et al. |
| 6,552,679 B2 | 4/2003 | Sassman et al. |

\* cited by examiner

METHOD FOR AUTOMATIC ASSOCIATION OF MOVING TARGET INDICATIONS FROM ENTITIES TRAVELING ALONG KNOWN ROUTE

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates generally to a method for relieving the tracker load in dense moving target indication (MTI) environment, and more particularly to a method for automatic association of moving targets indications from entities traveling along known routes.

Radar is an electromagnetic sensing system used for detecting, locating, tracking and identifying objects of various kinds at considerable distances. It operates by transmitting electromagnetic energy towards objects (targets), and observing the echoes returned from them. The targets include aircrafts, ships, spacecrafts, automotive vehicles and other objects that may reflect at least a portion of electromagnetic energy back to a receiver. For a typical radar, a narrow beam of electromagnetic wave is radiated from an antenna to scan and search a region where targets are expected. When a target is illuminated by the beam, it intercepts some of the radiated beam and reflects a portion back towards the receiver. By measuring the time duration from radiating the electromagnetic beam to receiving the reflected portion, the range, that is, the distance between the target and the radar, can be determined. In addition, the angular direction (bearing) of the target can also be detected from experiencing the phase of the received signal and the boresight direction in which the antenna points. Through measurement of target location at successive instants of time, the track of a target can be determined.

Many targets, including stationary and moving objects, are operative to reflect electromagnetic energy. To detect moving targets, particularly in a military environment, contemporary radar systems can discriminate the moving targets from the stationary targets. It is known that, for a moving target, the returned signal has a frequency shift (wavelength change) from the signal radiated thereon. This is the Doppler frequency shift known in the art. By measuring the Doppler frequency shift, the moving targets can be detected and discriminated from the stationary targets (such as land or sea clutter). Radar systems that detect moving targets by measuring Doppler frequency shift are referred as the moving-target indication (MTI) radars.

In addition to the range and directional angle, MTI radars are also operative to track an object by measuring the velocity (frequency) or wavelength at successive instants of time. Usually targets are moving at different speeds, so each target will have a different Doppler frequency (wavelength) shift. Therefore, the measurement of the Doppler shift of each target will allow multiple targets to be differentiated from each other. In some instances, there may be hundreds of moving targets which must be monitored at any given time. In such a dense, moving-target indication environment, it may be difficult to track each moving target within the field of view. Once the MTI radar is overloaded, the track of each moving target may be incomplete and confusing; and consequently, it is difficult to characterize or differentiate from other moving targets. Therefore, it is desirable to provide a method to facilitate the association of received radar data to corresponding targets, thus mitigating the computation load of the radar.

BRIEF SUMMARY OF THE INVENTION

The present invention provides a method for facilitating association of moving target indications from received radar data. The method comprises the following steps. A moving target indicator radar is used to detect a plurality of moving target indication data. The moving target indication data proximate to each identified route in the volume surveillance by the radar is selected and presented in a distance-time coordinate, such that each selected moving target indication data has a unique distance value and a unique time value. The time value is the time at which the MTI was observed. The distance value is the distance the MTI is from some arbitrary fixed point along the route. All selected moving target indication data proximate to a given route are then transformed from the distance-time coordinate to a slope-intercept coordinate, such that co-linear moving target indication data in the distance-time coordinate are transformed into a plurality of points superposed together with an identical slope value and an identical distance intercept value. All superposed points at each slope-intercept curves point to multiple observations of a single vehicle. They are mapped back to the distance-time coordinate, and the moving target indication data corresponding to the superposed points are thus associated.

In the above method, the step of selecting the moving target indication data further comprises predefining a proximity of the identified route and filtering the moving target indication data located beyond the proximity. For example, a proximate distance to the identified route can be predetermined based upon the spatial observation error of the MTI radar. The moving target indication data spaced from the identified route by a distance larger than the proximate distance are then removed. A Hough transform is performed for transforming the moving target indication data from the distance-time coordinate to the slope-intercept coordinate. Preferably, the associated moving target indication data is displayed in an animated display.

To eliminate the moving target data detected from unwanted objects or noise source, a threshold number of the superposed points can be predetermined, and the superposed points are removed from consideration when a number thereof is smaller than the threshold number. In one embodiment, the identified route is deduced from Doppler shift and route direction and speed along and the entities traveling along the identified route are travels at a constant speed.

When a plurality of entities traveling along a route, similar to the above method, a route of interest is identified, a plurality of moving target indication data is detected, and only the moving target indication data detected from the entities traveling within a proximity of the identified route are selected. The distance of the selected moving target indication data along the identified route in each instant of time is calculated. A Hough transform is then performed on the distance data to create a plurality of accumulated cells in a space of the Hough transform in response to a plurality sets of co-linear distance data, wherein each accumulated cell has an intensity proportional to the number of the co-linear distance data of the corresponding set. The moving target indication data corresponding to each entity moving at constant ground speed along the identified route even if curved can thus be dereferenced.

Similarly, to eliminate the noise and data obtained from unwanted source, a threshold intensity is predetermined, and the accumulation cells with an intensity smaller than the threshold intensity are removed from consideration. In this case there have not been enough consistent MTI observations to support the conclusion that there is a track.

In addition to distance characteristic, the present invention can also be applied to associate the moving target indication data according to other physical characteristics such as phase, directional angle, and speed. The method comprises the following steps. A route is identified, a plurality of moving target indication data is detected, and the moving target indication data obtained from entities traveling within a proximity of the identified route are selected. A physical characteristic from the selected moving target indication data at each instant of time is derived. The Hough transform is transformed on the physical characteristic to create an accumulation array. The moving target indication data corresponding to the accumulation array can thus be associated.

BRIEF DESCRIPTION OF THE DRAWINGS

These, as well as other features of the present invention, will become more apparent upon reference to the drawings wherein.

DETAILED DESCRIPTION OF THE INVENTION

The present invention provides a method for automatic association of moving target indication data detected from entities traveling along a route. In the present invention, it is assumed that a single entity traveling along the route has a constant speed. Therefore, for a single entity, the relationship between distance along the route versus time will create a straight line in a distance-versus-time graph. That is, in the distance-time coordinate, the co-linear MTI data will have a common slope and a common distance intercept. In a dense MTI environment with a large number of entities traveling along the route, a great amount of MTI data can be detected and illustrated in the distance-versus-time graph. Though the MTI data for a single entity will create a straight line in the distance-versus-time graph, such line is very likely hidden among the great amount of detected MTI data.

To identify the hidden straight line created by each entity, the present invention uses a Hough transform to transform the MTI data from the distance-time coordinate into a slope-intercept coordinate. For each MTI data in the distance-time coordinate, there are infinite lines passing there through. Each of the lines has a specific slope and distance intercept. The Hough transform presents the slope and distance intercept for each line by a point in the slope-intercept coordinate. Therefore, when a number of MTI data are co-linear in the distance-time coordinate, a plurality of points are superposed together with a common slope and a common distance intercept in the slope-intercept coordinate. The MTI data corresponding to the superposed points can thus be associated into a single entity. Further, when the number of the superposed points is under a predetermined value, the MTI data corresponding to the superposed points are very likely generated by unwanted objects or noise source that does not provide a regular behavior. The MTI data can thus be thresholded to suppress the noise. Furthermore, a convoy will appear as a group of parallel lines with differing intercepts on the distance-time graph.

Figure 1:
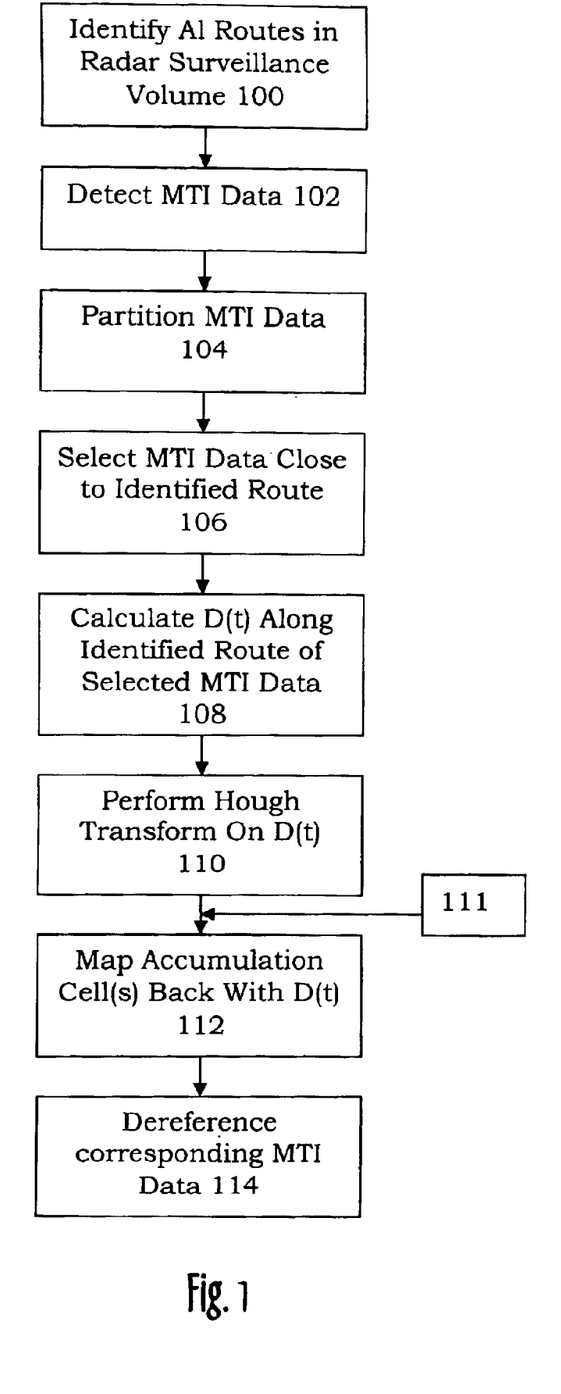
FIG. 1 is a flow chart showing the method for automatic association of moving target indications from entities traveling along a known route.
Figure 2:
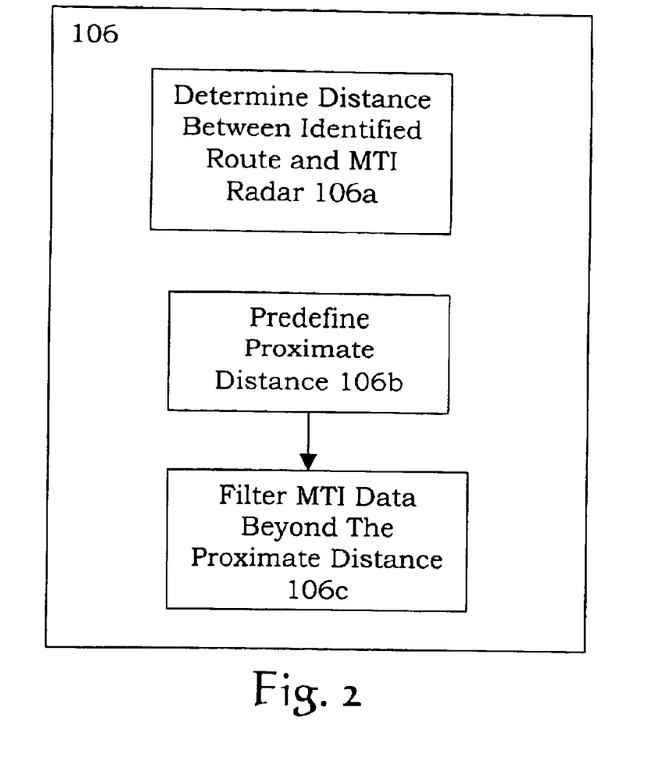
FIG. 2 shows a sub-routine of the process as shown in FIG. 1.
Figure 3:
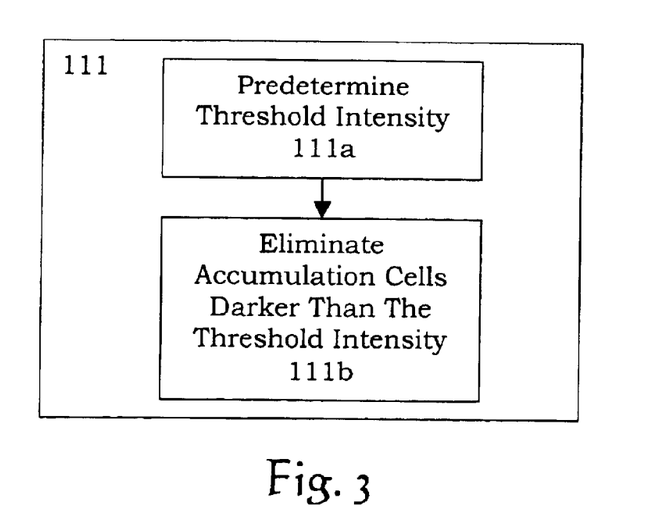
FIG. 3 shows a sub-routine of the process as shown in FIG. 1.
Figure 4:
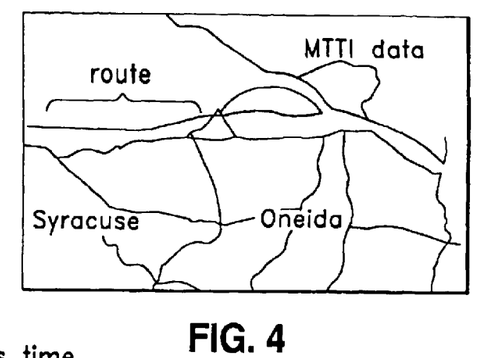
FIG. 4 shows a route along which entities are traveling.

FIG. 1 shows a flow chart of an embodiment of this method, and FIGS. 2 and 3 shows two sub-routines of the method as shown in FIG. 1. In the step 100 of FIG. 1, the route along which the entities are traveling is identified. The route is within a scan coverage of a MTI radar. Once the route is identified, the distance between each point of the route and the MTI radar can be determined. The operator may select or identify the route directly from a map, or using automatic process such as a line of communication finder. In this embodiment, the route between Oneida and Syracuse, N.Y. is identified exemplarily as shown in FIG. 4. Preferably, the identified route is substantially straight, but it is not necessary.

In the step 102 of FIG. 1, a moving target indicator radar is used to detect a plurality of moving target indication data. The moving target indication data includes the ranges, the directional angles, and velocity relative to the MTI radar. The MTI data may be detected from the entities traveling along the identified route as shown in FIG. 4, as well as those detected from other routes which are not specifically identified. Therefore, a significant amount of the moving target indication data may be detected when a great number of entities are traveling within the detectable range of the moving target indicator radar. In the step 104 of FIG. 1, the moving target indication data are partitioned into a plurality of frames, and in each frame, only the moving target indication data close to a segment of the identified route are selected in step 106 of FIG. 1. That is, only those moving target indication data detected from a proximity of the segment of the identified route are taken into account.

As shown in FIG. 2, the step 106 for selecting the moving target indication data further comprises three sub-steps 106a, 106b and 106c. In sub-step 106a, the distance between each point of the segment of the identified route and the MTI radar is calculated. In sub-step 106b, a proximity of the segment of the identified route is predefined. For example, the proximity may be defined as the laterally extent with a predetermined distance of the segment of the identified route. In step 106c, the moving target indication data detected from a location spaced from the identified route by a distance larger than the proximate distance are filtered, while the moving target indication data detected from a location spaced from the identified route by a distance no larger than the proximate distance are retained.

Figure 5:
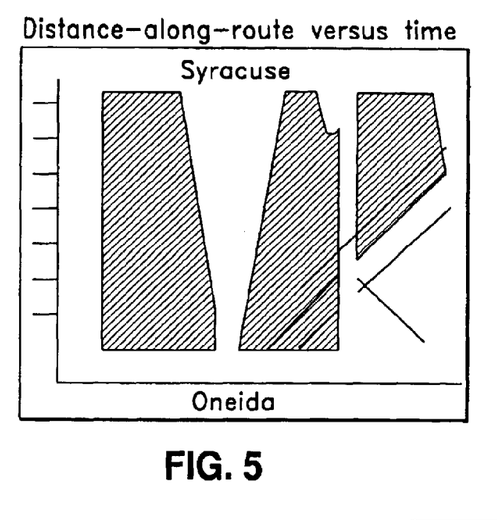
FIG. 5 shows a distance-versus-time graph for the moving target identification data detected from the entities traveling along to the route.

In step 108, from the ranges of the MTI data and the distance of the identified route, the distance of each MTI data along the identified route at each time instant is calculated and presented in a distance-time coordinate as shown in FIG. 5. In FIG. 5, the ordinate indicate the distance for each selected moving target indication data along the route from Oneida to Syracuse (or from Syracuse to Oneida), while the abscissa indicates the time when each of the moving target indication data is detected. As mentioned above, for a single entity traveling along the identified route with a constant speed, a linear relationship between distance D and time t is expected. That is, a straight line will be created in the distance-versus-time graph in FIG. 5 when a single entity travels along the identified route with a constant speed, even if the route is curved.

Figure 6:
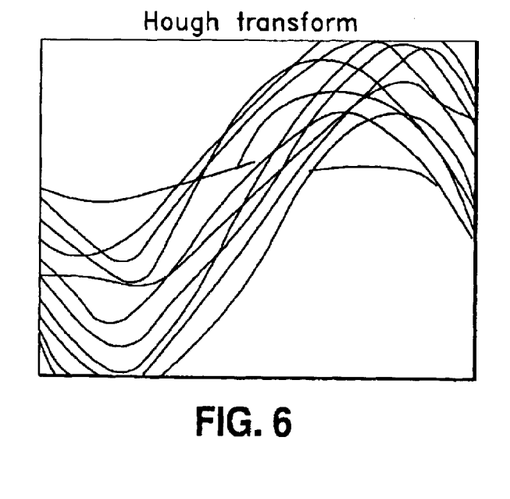
FIG. 6 shows the Hough transform of a set of the data of the distance-versus-time graph illustrated in FIG. 1.

In step 110, the MTI data presented in the distance-time coordinated is transformed into a slope-intercept coordinate by performing a Hough transform. As mentioned above, the moving target indication data detected from a single entity traveling with a constant creates a straight line in the graph. In other words, the points along the straight line have the same slope and distance intercept. Once the Hough transform is performed, superposed points with the same slope and distance intercept can be found in the slope-intercept coordinate. The superposed points is referred as an accumulation cell as shown in FIG. 6. Therefore, the moving target indication data corresponding to the accumulation cell are thus detected from the same entity traveling along the identified route.

Therefore, in step 112, the moving target indication data corresponding to the accumulation cell are then identified and associated in step 114. The step for identifying and associating the corresponding moving: target data is also referred as a dereferencing step. Preferably, an animated display is used to display the dereferenced moving target indication data to the operator.

In most occasions, more than one entity is traveling along the identified route. Therefore, more than one straight line are expected in the distance-versus-time graph. However, in the dense moving target indication environment, the operator may hardly distinguish one straight line from the other in the distance-versus-time graph. By performing the Hough transform, a plurality of accumulation cells are created in response to the plurality of entities traveling along the identified routes. The straight line of distance versus time mapped with each accumulation cell can then be distinguished, and the moving target indication data corresponding to respective entity can thus be identified.

Depending on the number of available moving target indication data in each straight line, the brightness (intensity) of the accumulation cells varies from one to another. For example, an accumulation cell imposed by only two points has much less brightness compared to those created by intersection of more than ten points in the distance-versus-time graph. As known to those skilled in the art, some of the moving target indication data may be detected from undesired sources. The straight line in the distance-time coordinate constructed by only two or a specific number of points may correspond to the moving target indication data detected from the undesired sources. Therefore, in the present invention, the Hough transform can be thresholded to eliminate the noise. Before mapping the accumulation cells back with the moving target indication data, steps 111a and 111b can be performed. In step 111a, a threshold intensity of the accumulation cells is predetermined. In step 111b, the accumulation cells with intensity lower than the threshold intensity are removed from consideration. That is, only those accumulation cells with brightness over the threshold brightness are taken into account in step 112. As a result, only those moving target indication data detected from the entities along the identified route are identified, while the moving target indication data generated from undesired source are eliminated.

The method for automatic association of moving target indication data from entities traveling along a route mentioned above can be applied to a variety of moving target indication exploitations. For example, when a convoy is traveling along a specific route, a vertical set of accumulation cells will be created in the Hough transform. One can thus perform convoy detection by this method. Therefore, according to specific pattern of the accumulation cells created in the parameter space of Hough transform, one can further discriminate the correlation of the entities traveling along the route.

In the above method, the route of interest need not be substantially straight, but the entities traveling along the route are assumed to have a constant speed. Therefore, the distance of the entities along the route as a function of time creates a plurality of straight lines in the distance versus time graph, which consequently creates a plurality of accumulation cells in the Hough transform graph. Such a Hough transform is also referred as the "straight-line Hough transform". It is appreciated that in addition to the straight-line Hough transform, the Hough transform can also discover shapes that cannot be represented by simple mathematical identities. The Hough transform used for transform the locus with a shape other than a straight line into an accumulation array is referred as a generalized Hough transform. Therefore, when the entities traveling along the route has variable speed, the method can also be employed. Moreover, in addition to the distance along route, other characteristics or physical properties such as the azimuth angle of the moving target indication data can also be selected to draw a graph. The generalized Hough transform is then performed on the characteristics to obtain an accumulation array in the parameter space of the Hough transform.

Figure 7:
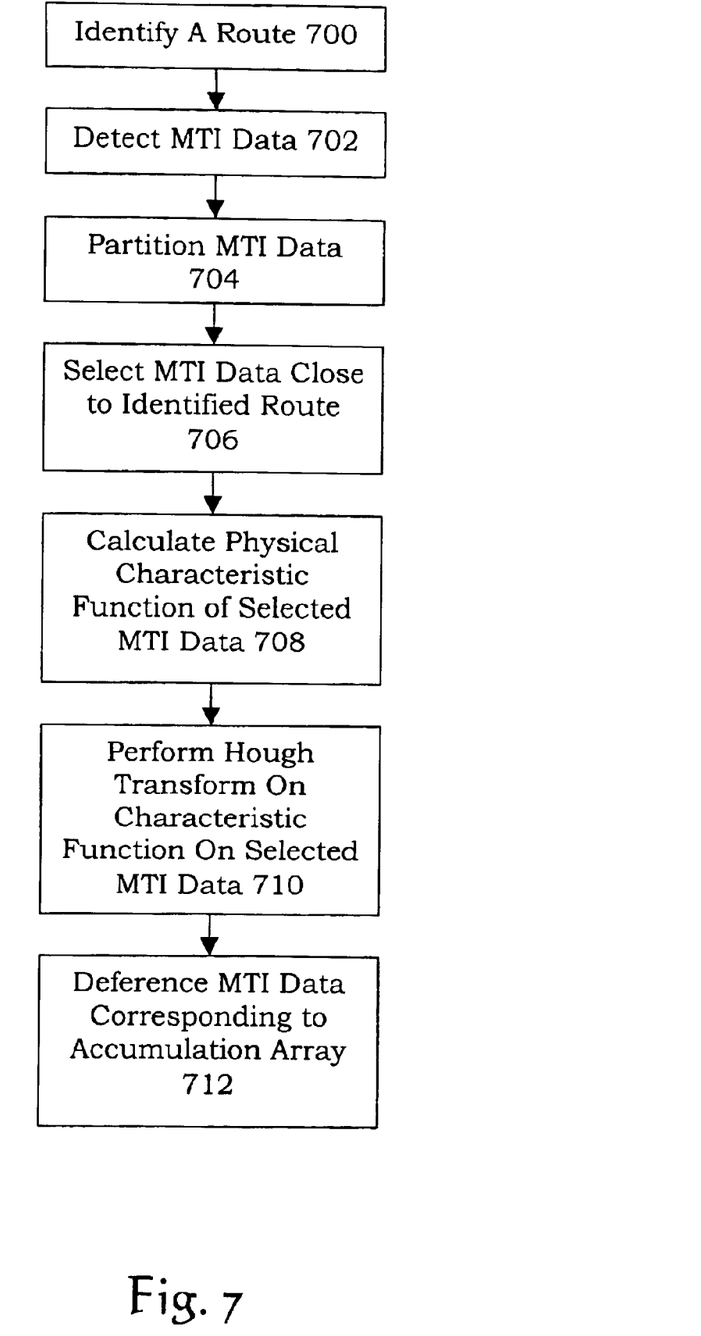
FIG. 7 shows another embodiment of the method for automatic association of moving target indications from entities traveling along a route according to the present invention.

The method for automatic association of moving target indication data from entities traveling a route that uses the generalized Hough transform is illustrated in FIG. 7. In FIG. 7, similar to the process flow in FIG. 1, a route is identified in step 700, a plurality of moving target indication data is detected in step 702, and the moving target indication data are partitioned into a plurality of frames in step 704. In step 706, only the moving target indication data close to the route are selected. In step 708, a physical characteristic function of the selected moving target indication data is calculated, preferably as a function of time. The generalized Hough Transform is performed on the physical characteristic function to obtain, in response to the entities traveling along the route, an accumulation array is created in the Hough Transform in step 710. The moving target indication data corresponding to the accumulation array are then dereferenced in step 712.

Indeed, each of the features and embodiments described herein can be used by itself, or in combination with one or more of other features and embodiment. Thus, the invention is not limited by the illustrated embodiment but is to be defined by the following claims when read in the broadest reasonable manner to preserve the validity of the claims.

What is claimed is:

1. A method for automatic association of moving target indications from at least one entity traveling along a known route, comprising:

identifying a route within a detectable range of a moving target indicator radar;

using the moving target indicator radar to detect a plurality of indication data of at least one moving target;

selecting the moving target indication data proximate to the identified route;

presenting the selected moving target indication data in a distance-time coordinate, such that each selected moving target indication data has a unique distance value and a unique time value;

transforming the moving target indication data from the distance-time coordinate to a slope-distance intercept coordinate, such that co-linear moving target indication data in the distance-time coordinate are transformed into a plurality of points superposed together with a substantially identical slope value and a nearly identical distance intercept value;

mapping the single point back to the distance-time coordinate; and associating the moving target indication data corresponding to the single point to a single entity.

2. The method as recited in claim 1, wherein the step of selecting the moving target indication data further comprises:

predefining a proximity of the identified route; and filtering the moving target indication data located beyond the proximity.

3. The method as recited in claim 1, wherein the step of selecting the moving target indication data further comprises:

predetermining a proximate distance to the identified route; and filtering the moving target indication data spaced from the identified route by a distance larger than the proximate distance.

4. The method as recited in claim 1, wherein the step of transforming the moving target indication data includes performing Hough transform thereon.

5. The method as recited in claim 1, further comprising a step of presenting the associated moving target indication data in an animated display.

6. The method as recited in claim 1, further comprising:

predetermining a threshold number of the superposed points; and eliminating the superposed points when a number thereof is smaller than the threshold number.

7. The method as recited in claim 1, wherein the route is substantially straight.

8. The method as recited in claim 1, wherein the entities travels along the identified route with a constant speed.

9. A method for automatic association of moving target indications from a plurality of entities traveling along a route, comprising:

identifying a route of interest;

detecting a plurality of indication data of at least one moving target;

selecting only the moving target indication data detected from the entities traveling within a proximity of the identified route;

calculating distance of the selected moving target indication data along the identified route in each instant of time;

performing Hough transform on the distance data to create a plurality of accumulated cells in a space of Hough transform in response to a plurality sets of co-linear distance data, wherein each accumulated cell has an intensity proportional to the number of the co-linear distance data of the corresponding set; and dereferencing the moving target indication data corresponding to each entity moving along the identified route.

10. The method as recited in claim 9, further comprises using a moving target indication radar for detecting the moving target indication data.

11. The method as recited in claim 9, wherein the step of selecting the moving target indication data further comprises:

predefining the proximity; and filtering the moving target indication data located beyond the proximity.

12. The method as recited in claim 9, wherein the step of selecting the moving target indication data further comprises:

predetermining a proximate distance to the identified route; and filtering the moving target indication data spaced from the identified route by a distance larger than the proximate distance.

13. The method as recited in claim 9, wherein the step of dereferencing the moving target indication data further comprises mapping the accumulation cells with the corresponding set of distance data.

14. The method as recited in claim 13, further comprising a step of identifying the moving target indication data detected from each of the entity.

15. The method as recited in claim 9, further comprising a step of presenting the dereferenced moving target indication data in an animated display.

16. The method as recited in claim 9, further comprising:

predetermining a threshold intensity; and eliminating the accumulation cells with an intensity smaller than the threshold intensity.

17. The method as recited in claim 9, wherein the identified route is substantially straight.

18. The method as recited in claim 9, wherein each the entities traveling along the identified route has a respective constant speed.

19. A method for automatic association of moving target indications from entities traveling along a route, comprising:

identifying a route;

detecting a plurality of indication data of at least one moving target;

selecting the moving target indication data obtained from entities traveling within a proximity of the identified route;

deriving a physical characteristic from the selected moving target indication data at each instant of time;

performing Hough transform on the physical characteristic to create an accumulation array; and dereferencing the moving target indication data corresponding to the accumulation array.

20. A method for automatic association of moving target indications from at least one entity traveling along a known route, comprising:

identifying a route within a detectable range of a moving target indicator radar;

using the moving target indicator radar to detect a plurality of indication data of at least one moving target;

selecting the moving target indication data proximate to the identified route;

deriving velocity information and initial traveling time instant for each selected moving target indication data; and associating the selected moving target indication data that have the same velocity and initial traveling time instant to a single entity.

21. The method as claimed in claim 20, wherein the step of deriving velocity information and initial traveling time instant for each selected moving target indication data comprises presenting the selected moving target indication data in a distance-time coordinate, such that each of the selected moving target indication data has a unique distance at each time instant.

22. The method as claimed in claim 21, wherein the step of associating the selected moving target indication data comprises transforming the selected moving target indication data from the distance-time coordinate into a velocity-initial traveling time coordinate, such that the selected moving target indication data having the same velocity and initial traveling time are transformed into a plurality of points superposed together.

23. The method as claimed in claim 21, wherein the step of transforming the selected moving target indication data comprises performing Hough transform.

24. The method as claimed in claim 21, further comprising detecting a convoy of entities by identifying a group of parallel lines in the equally-spaced distance-time coordinate.

25. The method as claimed in claim 24, wherein the group of parallel equally-spaced lines includes a plurality of points in Hough Space.

* * * * *